(12) United States Patent
Sabouri-Sichani et al.

(10) Patent No.: US 12,191,950 B2
(45) Date of Patent: Jan. 7, 2025

(54) METHODS AND DEVICES FOR CELL MEASUREMENT IN A CELLULAR NETWORK

(71) Applicant: Nokia Technologies Oy, Espoo (FI)

(72) Inventors: Faranaz Sabouri-Sichani, Aalborg (DK); Samantha Caporal Del Barrio, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/035,544

(22) PCT Filed: Nov. 4, 2021

(86) PCT No.: PCT/EP2021/080576
§ 371 (c)(1),
(2) Date: May 5, 2023

(87) PCT Pub. No.: WO2022/096543
PCT Pub. Date: May 12, 2022

(65) Prior Publication Data
US 2024/0014868 A1 Jan. 11, 2024

(30) Foreign Application Priority Data
Nov. 9, 2020 (FI) ..................................... 20206128

(51) Int. Cl.
*H04B 7/06* (2006.01)
*H04B 7/08* (2006.01)
(Continued)

(52) U.S. Cl.
CPC ......... *H04B 7/0608* (2013.01); *H04B 7/0805* (2013.01); *H04B 17/318* (2015.01); *H04W 36/0085* (2018.08)

(58) Field of Classification Search
CPC .. H04B 7/0608; H04B 7/0805; H04B 17/318; H04B 17/21; H04B 7/0695;
(Continued)

(56) References Cited

U.S. PATENT DOCUMENTS

| 2018/0041936 A1* | 2/2018 | Kim | ..................... H04W 72/542 |
| 2021/0084669 A1* | 3/2021 | Mondal | ................. H04L 5/0032 |

(Continued)

FOREIGN PATENT DOCUMENTS

| CN | 110463264 A | 11/2019 |
| WO | WO 2020/089513 A1 | 5/2020 |

OTHER PUBLICATIONS

Qualcomm Incorporated, "UE Power Consumption Reduction in RRM Measurements," 3GPP TSG-RAN WG1 Meeting #94bis, R1-1813449, Nov. 12-16, 2018, Spokane, USA.

*Primary Examiner* — Emmanuel Bayard
(74) *Attorney, Agent, or Firm* — McCarter & English LLC

(57) ABSTRACT

A communication device for use in a cellular network includes a plurality of antenna panels for communication with cells in a cellular network, circuitry for carrying out a panel selection process based on received power level for selecting an antenna panel, and circuitry for performing measurement cycles requiring determination of respective power levels. The circuitry for performing measurement cycles measures a first received power level from said neighbor cell with the antenna panel selected for said neighbor cell and measures a second received power level from said neighbor cell with the antenna panel selected for said serving cell. The circuitry for performing measurement cycles measures a third power level received for said neighbor cell with the antenna panel selected for said serving cell and adjusting said third power level with an offset function,
(Continued)

said adjusted third power level being used as the respective power level for said neighbor cell.

16 Claims, 7 Drawing Sheets

(51) Int. Cl.
*H04B 17/318* (2015.01)
*H04W 36/00* (2009.01)

(58) Field of Classification Search
CPC . H04B 7/0404; H04B 7/088; H04W 36/0085; H04W 24/02
USPC ........................................ 375/262, 267, 299
See application file for complete search history.

(56) References Cited

U.S. PATENT DOCUMENTS

2021/0356581 A1* 11/2021 Keating ................ H04B 7/0619
2022/0330038 A1* 10/2022 Ganesan .............. H04B 7/0404

* cited by examiner

METHODS AND DEVICES FOR CELL MEASUREMENT IN A CELLULAR NETWORK

CROSS REFERENCE TO RELATED APPLICATION

This patent application is a U.S. National State application of International Patent Application Number PCT/EP2021/080576 filed Nov. 4, 2021, which is hereby incorporated by reference in its entirety, and claims priority to FI 20206128 filed Nov. 9, 2020.

TECHNICAL FIELD

Methods and devices for cell measurements in a cellular network are described. The context of these methods and devices can be that of a user equipment comprising a plurality of antenna panels performing radio resource management (RRM) measurements.

BACKGROUND

In 5G networks, user equipment (UE) devices have to perform neighbor cell measurements. Such measurements consume UE power.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

One or more exemplary embodiments concern a communication device comprising:
 a plurality of antenna panels for communication with cells in a cellular network,
 means for carrying out a panel selection process based on received power level for selecting a respective antenna panel among said plurality of antenna panels for each of a serving cell and a neighbor cell;
 means for performing measurement cycles requiring determination of respective power levels received from said serving cell and said neighbor cell;
 said means for performing measurement cycles being configured to, during a first type measurement cycle, measuring a first received power level from said neighbor cell with the antenna panel selected for said neighbor cell and measuring a second received power level from said neighbor cell with the antenna panel selected for said serving cell;
 said means for performing measurement cycles being further configured to, during a second type measurement cycle, measuring a third power level received for said neighbor cell with the antenna panel selected for said serving cell and adjusting said third power level with an offset function of the difference between the first and second power levels, said adjusted third power level being used as the respective power level for said neighbor cell.

In at least some exemplary embodiments, said means for performing said measurement cycles are further configured to measure first, second and third power levels for a plurality of beams of said neighbor, and to carry out adjustment of said third power level of each beam of said plurality of beams.

In at least some exemplary embodiments, the panel selection process and the measurement cycles are carried out for a plurality of neighbor cells.

In at least some exemplary embodiments, the received power level is a Reference Signal Received Power level.

In at least some exemplary embodiments, the device further comprises means for performing an offset confidence check wherein if said check fails, said first and second power levels are refreshed by performing at least one first type measurement cycle.

In at least some exemplary embodiments, said means for performing an offset confidence check are further configured to check one or more of the following conditions. The check fails if at least one among the checked conditions is met:
 M consecutive second type measurement cycles have been performed, where M is an integer equal to or greater than one;
 the respective power level for at least one neighbor cell resulting from the adjustment of the third power level is above a first threshold;
 the difference between two consecutive measurements of said second power level is above a second threshold;
 the communication device selects a different antenna panel for the serving cell;
 a handover to a new serving cell has occurred.

In at least some exemplary embodiments, M decreases with increasing mobility of said communication device.

In at least some exemplary embodiments, the means for performing the measurement cycles are configured to perform the first type measurement cycle N consecutive times, with N being an integer increasing with the mobility of said communication device.

One or more exemplary embodiments concern a method at a communication device comprising a plurality of antenna panels for communication with cells in a cellular network, said method comprising:
 carrying out a panel selection process based on received power level for selecting a respective antenna panel among said plurality of antenna panels for each of a serving cell and a neighbor cell;
 performing measurement cycles requiring determination of respective power levels received from said serving cell and said neighbor cell;
 during a first type measurement cycle, measuring a first received power level from said neighbor cell with the antenna panel selected for said neighbor cell and measuring a second received power level from said neighbor cell with the antenna panel selected for said serving cell;
 during a second type measurement cycle, measuring a third power level received from said neighbor cell with the antenna panel selected for said serving cell and adjusting said third power level with an offset function of the difference between the first and second power levels, said adjusted third power level being used as the respective power level for said neighbor cell.

In at least some exemplary embodiments, the panel selection process and the measurement cycles are carried out for a plurality of neighbor cells.

In at least some exemplary embodiments, the received power level is a Reference Signal Received Power level.

In at least some exemplary embodiments, the method or methods further comprise an offset confidence check wherein if said check fails, said offset being refreshed by performing at least one first type measurement cycle.

In at least some exemplary embodiments, said offset confidence check comprises checking one or more of the following conditions. The check fails if at least one among the checked conditions is met:

M consecutive second type measurement cycles have been performed, where M is an integer equal to or greater than one;

the respective power level for at least one neighbor cell resulting from the adjustment of the third power level is above a first threshold;

the difference between two consecutive measurements of said second power level is above a second threshold;

the communication device selects a different antenna panel for the serving cell;

a handover to a new serving cell has occurred.

In at least some exemplary embodiments, M decreases with increasing mobility of said communication device.

In at least some exemplary embodiments, the first type measurement cycle is performed N consecutive times, with N being an integer increasing with the mobility of said communication device.

One or more exemplary embodiments concern a non-transitory computer-readable medium storing computer-executable code that, when executed by at least one processor at a communication device, causes the communication device to perform the steps of the methods according to one or more exemplary embodiments disclosed herein.

BRIEF DESCRIPTION OF THE DRAWINGS

Example embodiments will be more fully understood from the detailed description provided herein and the accompanying drawings, which are given by way of illustration only.

FIG. 4b is a diagram representing the upper right quadrant of FIG. 4a;

Figure 1:
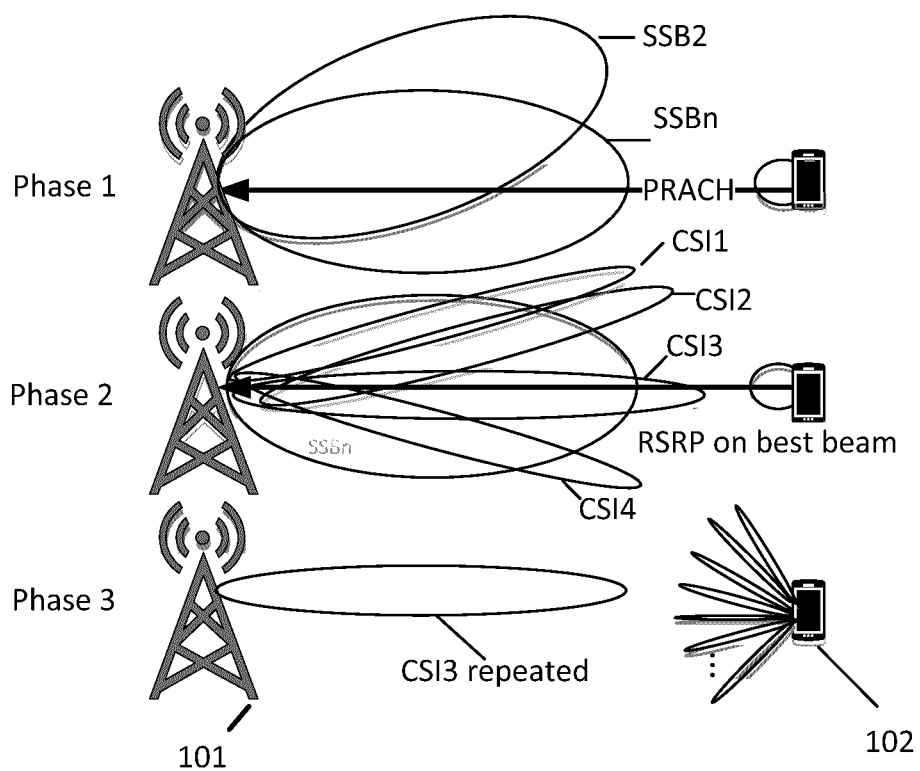
FIG. 1 is a schematic diagram of phases in a receiver and transmitter beam alignment procedure in the frame of which at least some embodiments may be used.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various exemplary embodiments will now be described more fully with reference to the accompanying drawings. However, specific structural and functional details disclosed herein are merely representative for purposes of describing example embodiments. The exemplary embodiments may be embodied in many alternate forms and should not be construed as limited to only the embodiments set forth herein. It should be understood that there is no intent to limit example embodiments to the particular forms disclosed.

It should be appreciated by those skilled in the art that any functions, engines, block diagrams, flow diagrams, state transition diagrams and/or flowcharts herein represent conceptual views of illustrative circuitry embodying the principles of the exemplary embodiments. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the present description, functional blocks denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may be any physical media that can be read, written or more generally accessed by a computer/a processing device. Examples of computer storage media include, but are not limited to, a flash drive or other flash memory devices (e.g. memory keys, memory sticks, USB key drive), CD-ROM or other optical storage, DVD, magnetic disk storage or other magnetic storage devices, solid state memory, memory chip, RAM, ROM, EEPROM, smart cards, a relational database management system, a traditional database, or any other suitable medium that can be used to carry or store program code in the form of instructions or data structures which can be read by a computer processor. Also, various forms of computer-readable medium may be used to transmit or carry instructions to a computer, including a router, gateway, server, or other transmission device, wired (coaxial cable, fiber, twisted pair, DSL cable) or wireless (infrared, radio, cellular, microwave). The instructions may include code from any computer-programming language, including, but not limited to, assembly, C, C++, Basic, SQL, MySQL, HTML, PHP, Python, Java, Javascript, etc. Embodiments of a computer-readable medium include, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

According to example embodiments, network elements, network devices, data servers, network resource controllers, network apparatuses, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more integrated circuits one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Exemplary embodiments described herein are placed in the frame of a 5G Next Radio (NR) communication network. However, the Person Skilled in the Art may easily apply the teachings disclosed herein to other types of networks in which mobile user equipment with multiple antenna panels may be used.

It is also to be noted that while the exemplary embodiments described herein take the example of the UE being in the radio resource control (RRC) connected state, the embodiments are not limited to that context. While in the RRC idle/inactive state, radio resource management (RRM) measurements may be relaxed under certain conditions, the embodiments may easily be adapted to be used within such a context, in particular for neighbor cell measurements. While power savings may be less in idle mode (the UE listens to SSBs but does not perform channel state information reference signal (CSI-RS) measurements, see beam alignment procedure phases 1 and 2 below), they may still prove valuable.

In what follows, a user equipment ('UE') typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a UE may also be a nearly exclusive uplink only device, of which an example is a camera or video camera loading images or video clips to a network.

A UE may be carried by or be integral part of a moving object such as an individual or a manned or unmanned vehicle or moving device (car, drone, bicycle, train, ship, autonomous vehicle . . . ).

A UE may also be a device having capability to operate in Internet of Things (IoT) network which is a scenario in which objects are provided with the ability to transfer data over a network without requiring human-to-human or human-to-computer interaction. In some applications, a UE may be a small portable device with radio parts (such as a watch, earphones or eyeglasses. The UE may be implemented as a single hardware device or may be implemented on separate interconnected hardware devices interconnected by one or more communication links, with wired and/or wireless segments. The UE may also be called a subscriber unit, mobile station, remote terminal, access terminal, user terminal or user device just to mention but a few names or apparatuses.

According to one or more embodiments, the UE comprises several antenna panels. A multi panel user equipment is sometimes referred to with the acronym 'MPUE' in the literature. The antenna panels may be positioned so as to allow reception of signals from different directions.

Frequency bands allocated for NR belong to different frequency ranges (FR), such as FR1 (from 410 MHz to 7125 MHz) and FR2 (from 24250 MHz to 52600 MHz). Path loss is increased significantly for high frequency millimeter waves in FR2 and above. Further attenuation is caused among others by buildings, rain and plants. Beam forming, with one or more antenna panels, at reception and/or at transmission can be used to at least partially alleviate the consequences.

FIG. 1 is a schematic diagram illustrating three phases of an exemplary initial transmission and reception beam alignment procedure—or beam management procedure—between a base station 101 (also referred to as 'gNB' in a 5G context) and a UE 102. The procedure iteratively refines the antenna panel and beam selection for both entities.

In a first phase, the base station performs Synchronization Signal Block (SSB) wide beam sweeping. The UE cycles through its antenna panels to select the best panel during a so-called Synchronization Signal Burst ('SS Burst') in which one SSB is sent on each beam. For example, the 'best panel' may be the panel for which the highest SSB Reference Signal Receive Power (RSRP) was measured. Once the UE has selected the appropriate panel, it carries out a random access procedure (based on sending a random access channel preamble or 'PRACH') on the best received SSB beam. As a result of this phase, the base station will have selected a wide beam and the UE will have selected an antenna panel. The UE will also have received information which will enable it to receive PDCCH channels.

In a second phase, the base station performs narrow beam sweeping while sending channel state information reference signal (CSI-RS) for evaluation by the UE. The CSI-RS is used to estimate the channel and report channel quality information, in particular based on RSRP measurements and reports back to the base station which of the CSI-RS beams is the best one. As a result of this phase, the base station will have selected a narrow beam (e.g. CSI3 in FIG. 1).

In a third phase, the base station repeatedly sends CSI-RS signals on the narrow beam selected during the second phase. The UE performs a narrow beam sweep using the antenna panel selected during the first phase and selects a best narrow beam. This selection may for example be based on the highest RSRP measurement obtained. At the end of this phase, the UE and the base station are aligned and the link budget is improved based on the beamforming procedure.

General information about beam alignment can be found in 3GPP TR 28.802 section 6.1.6 and in TS 38.214 section 5.2.

Concerning the first phase, seen from the UE possessing multiple antenna panels, different assumptions may be made as to how such multiple panels can or will be used. Among such assumptions, one may for example consider:

Assumption 1: Only one panel among the multiple panels is active at any given time. The UE may switch to or activate another panel, within a switching/activation delay of X milliseconds.

Assumption 2: Several panels among the multiple panels are active at the same time, and more than one among the active panels can be used for transmission.

Assumption 3: Several panels among the multiple panels are active at the same time, but only one among the active panels can be used for transmission.

For Assumptions 2 and 3, it is assumed that two active panels and corresponding receive chains are used for reception.

One or more of the above phases may be repeated one or more times to increase accuracy of the beam alignment between the base station and the UE and/or to take into account a possibly changing environment.

For example, the second and third phases may be repeated periodically for intra-cell beam management and beam tracking in connected mode, while the first phase may be used for initial access, RRM measurements, handover, beam failure recovery, etc . . . , then followed by the second and third phases.

While determining the degree of freedom in the spatial domain, the number of narrow beams considered during the beam alignment procedure impacts both latency and signaling overhead, as it implies transmission of reference signals in many directions and narrow beam alignment at both ends of the communication link.

Radio resource management (RRM) measurements are configured by the NW for mobility management and include list of neighboring cells the UE should measure along with its serving cell. Among other parameters provided to the UE as part of the UE measurement configuration is different measurement report triggering conditions with different threshold values for serving cell's measured received power at the UE and/or relative threshold for serving cell's measured received power at the UE compared to a neighboring cell's measured received power at the UE. The UE should provide measurement reports including its serving cell and the configured neighboring cells periodically or whenever a measurement reporting trigger condition is met [3GPP TS 38.331, Section 5.5]. A multi panel UE should run the panel selection procedure to decide on the best panel for a given neighboring cell, determine the N (N>=1) strongest beams on that panel after L2 and L3 filtering, and determine the cell measured value for reporting as an average value of the N strongest beams.

The more measurements are carried out by the UE, the higher the UE power consumption. Measurement requirements may be relaxed under certain conditions. In the frame of RRM, this can for example be the case when the UE is in Radio Resource Control (RRC) Idle/Inactive state and has low mobility and is not located at the edge of a cell. RRM measurements are however not relaxed when the UE is in the RRC_connected state.

According to a first point, in FR2, multi-panel UEs are used. This may introduce more numerous and/or longer measurements as part of the panel and beam selection. The problem is particularly relevant for Assumption 1, or for Assumption 2/3 where the front-end can only receive on two chains simultaneously but the UE has more than two panels, typically four panels:

A measurement is done per panel and in case measurements are carried out sequentially, a multi-panel UE's receive chain (from the front end to the baseband processing) needs to be on during a period of time which is Z times longer than for a single panel UE, with Z being the number of panels of the UE.

Table 1 shows an illustrative example of a possible impact on power consumption on the UE. Three exemplary cases are shown: a one panel UE, a three panel UE for which measurements are carried out sequentially for each of the three panels, and a three panel UE for which measurements are carried out simultaneously in parallel on all panels.

TABLE 1

| Device module | 1 panel | 3 panels sequentially | 3 panels simultaneously |
| --- | --- | --- | --- |
| Front-end | x (20%) | 3*x | 3*(parallel) |
| Baseband | y (40%) | 3*y | ~2*y |
| Transceiver | z (40%) | 3*z | ~2*z | x, y and z represent the power consumed by each stage—the percentages given are provided purely as a possible comparative magnitude for illustrative purposes. In Table 1, the power consumed by a three panel UE with sequential measurements is simply three times the power consumed by a single panel UE. For a three panel UE with parallel measurements, the front-end will still be proportional to the number of panels, whereas for the baseband processing and the transceiver, shared hardware resources may reduce the overall power used compared to the sequential case. Actual values would depend on specific hardware implementations.

According to a second point, it is moreover to be expected that due to the short range and propagation conditions in the FR2 frequency range and above, more frequent measurements will be needed. This is particularly likely in higher mobility use cases because of the inherent directivity of the link in millimeter waves. Furthermore, the narrower the beam, the higher the sensitivity to environmental changes, and thus the higher the need for beam tracking and beam realignment for reaching an appropriate link budget.

According to a third point, measuring at FR2 and above requires more power than FR1, as indicated in 3GPP TR 38.840 release 16, section 8.1.4 "UE power consumption model for RRM measurements".

Figure 2:
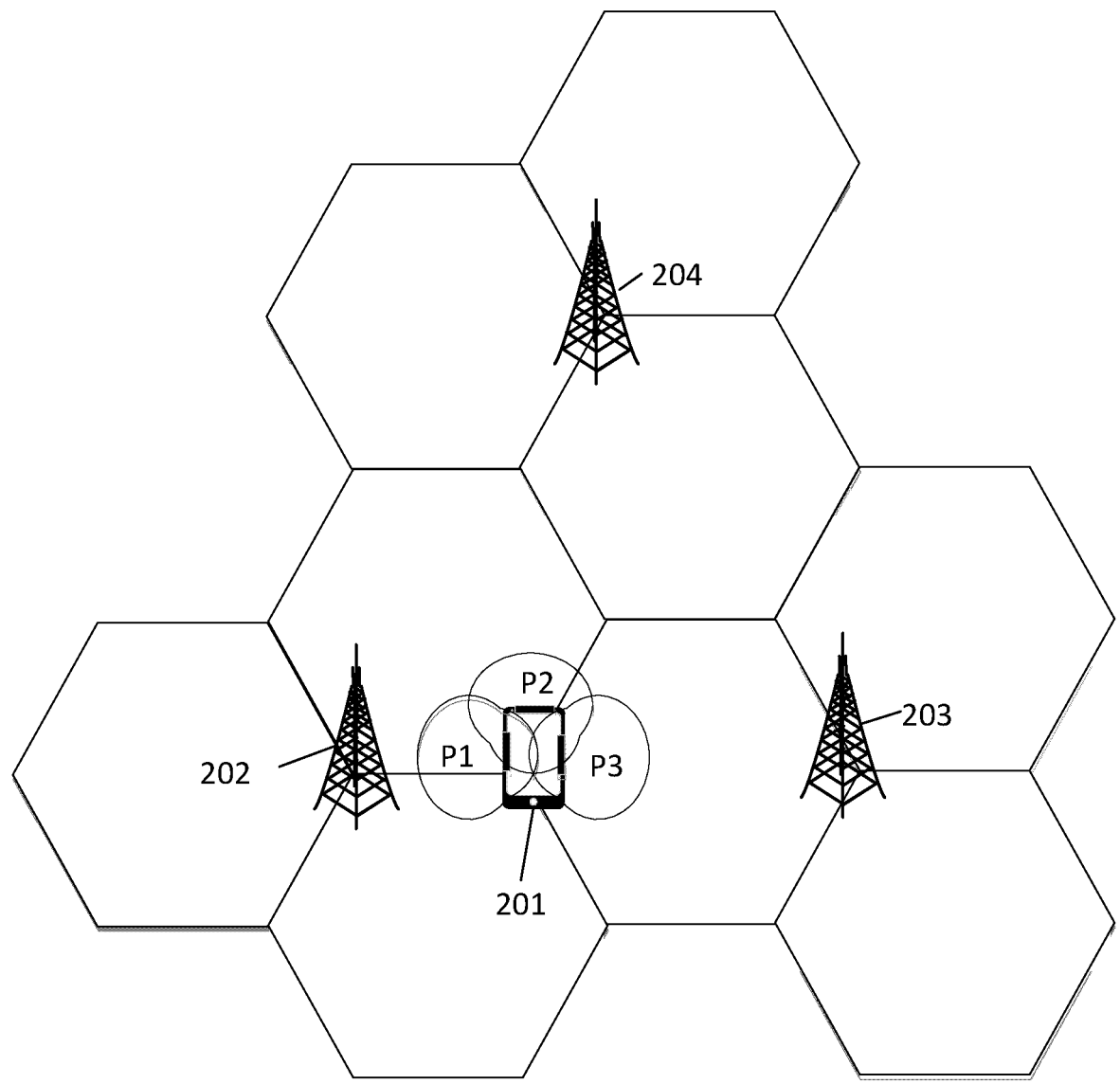
FIG. 2 is a schematic diagram of a multi-panel UE and the position of its panels relative to a number of base stations.

FIG. 2 is a schematic diagram illustrating the positioning of an exemplary UE 201 with regard to three base stations 202, 203 and 204. UE 201 possesses three antenna panels, referenced P1, P2 and P3 in FIG. 2. The main lobe of each antenna is schematically represented next to each antenna panel.

Power measurement levels, such as RSRP levels for a given beam from a given base station, vary according to which antenna panel is used by the UE for performing the measurement. Differences in measured levels may be very large, e.g. considering the front lobe/back lobe ratio of certain antennas. In the example of FIG. 2, panel P1 is likely the best choice for carrying out measurements for base station 202, less so for station 204, and with the largest gap for station 203.

Depending on the panel scanning and panel switching process implemented by the UE, the power consumption and/or the link reliability may be impacted:

(a) If for the purpose of neighbor cell measurements to decide panel switching, the UE measures from more than one panel simultaneously.

(b) Link reliability may be compromised because delayed cell change may occur. This may be the case when the UE measures only from one panel at a time such as in assumption 1 above, or if it measures neighbor cells only from the panel selected for the serving cell. Throughput degradation or even beam failure may occur.

Figure 3:
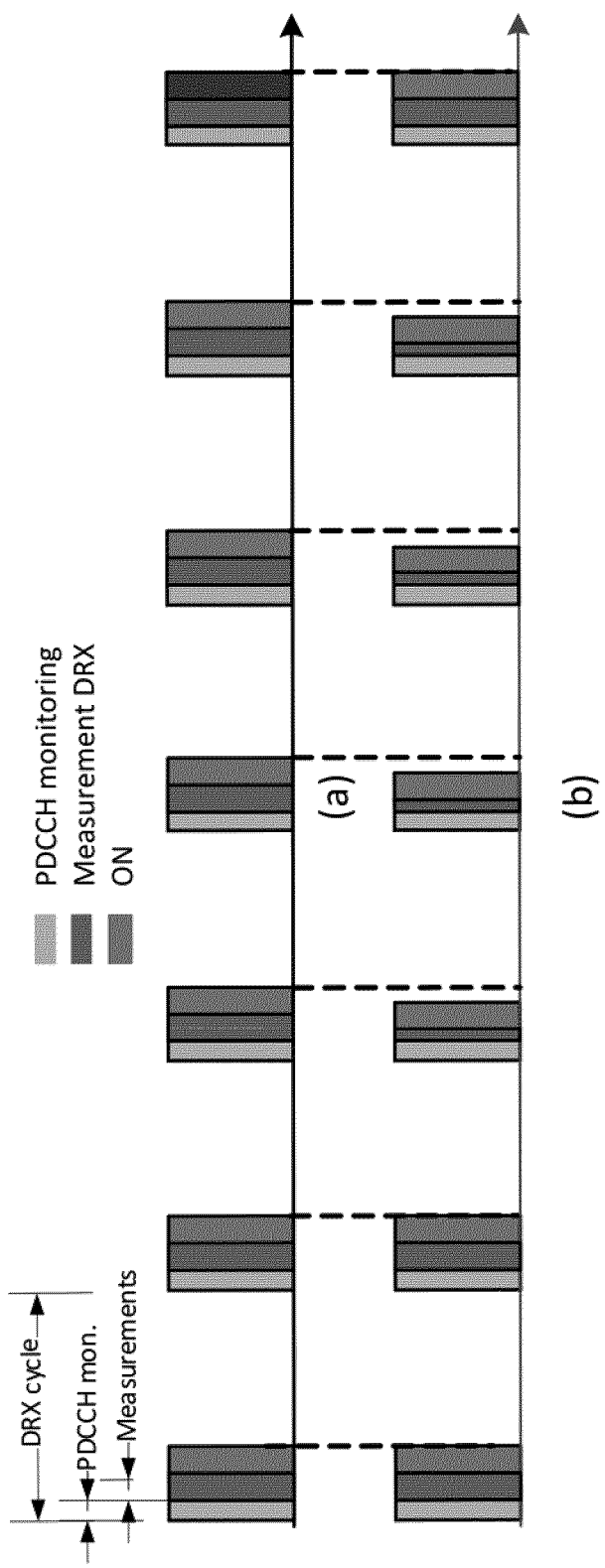
FIG. 3 is a diagram of discontinued reception (DRX) cycles in a legacy configuration and according to one or more embodiments.

FIG. 3 is a schematic diagram illustrating discontinuous reception cycles in the RRC connected state ('C-DRX' cycles), both for legacy C-DRX cycles (upper timeline 'a' of FIG. 3) and when implementing at least one exemplary embodiment (lower timeline 'b' of FIG. 3). In FIG. 3, a DRX cycle comprises two distinct time intervals: a first interval ('ON-time') corresponds to the interval during which the UE is active and a second interval ('OFF time') during which the UE is in sleep mode to save power. The first interval comprises three sequential sub-intervals during which the UE respectively monitors PDCCH (Physical Downlink Control CHannel) information received from the serving base station, carries out neighbor cell measurements and performs other scheduled data uplink transmission or downlink reception. For the sake of simplicity, each sub-interval in the legacy timeline has a constant duration, this not necessarily being the case in a real implementation, especially with regard to the duration of the sub-interval corresponding to scheduled traffic. In the lower timeline, reduction of the sub-interval required for measurements may reduce the ON-time, given unchanged scheduled traffic, and thus allow the UE to go back to sleep faster, reducing the UE's power consumption related to RRM measurements.

According to one or more exemplary embodiments, the UE provides estimates of beam measurements for neighbor cells based on power (e.g. RSRP) measurements made for these cells using the best panel selected for the serving cell. Such measurements refer to the gNB beam measurement evaluated by the UE panel exhibiting a broad beam configuration. Note that the UE panel can be configured for different beamwidths as well as for different angular directions. During neighbor cell measurements, the UE is typically configured with a broad beam as it does not know where the power is coming from. The UE thus does not switch panels for obtaining the estimates, since it only uses the serving cell's panel. In order to obtain this estimate for a given neighbor cell, the measurement made for the given neighbor cell using the panel selected for the serving cell is corrected by an offset. This offset for the given neighbor cell has previously been determined during a default measurement cycle: it is equal to the difference between a measurement carried out for the given neighbor cell during that default cycle as previously described (using the 'best' panel determined for the neighbor cell) and a measurement made using the serving cell's panel (the same panel as the one used later on for the estimate).

Default measurement to refresh the offset can be triggered based on one or more conditions.

Figure 4A:
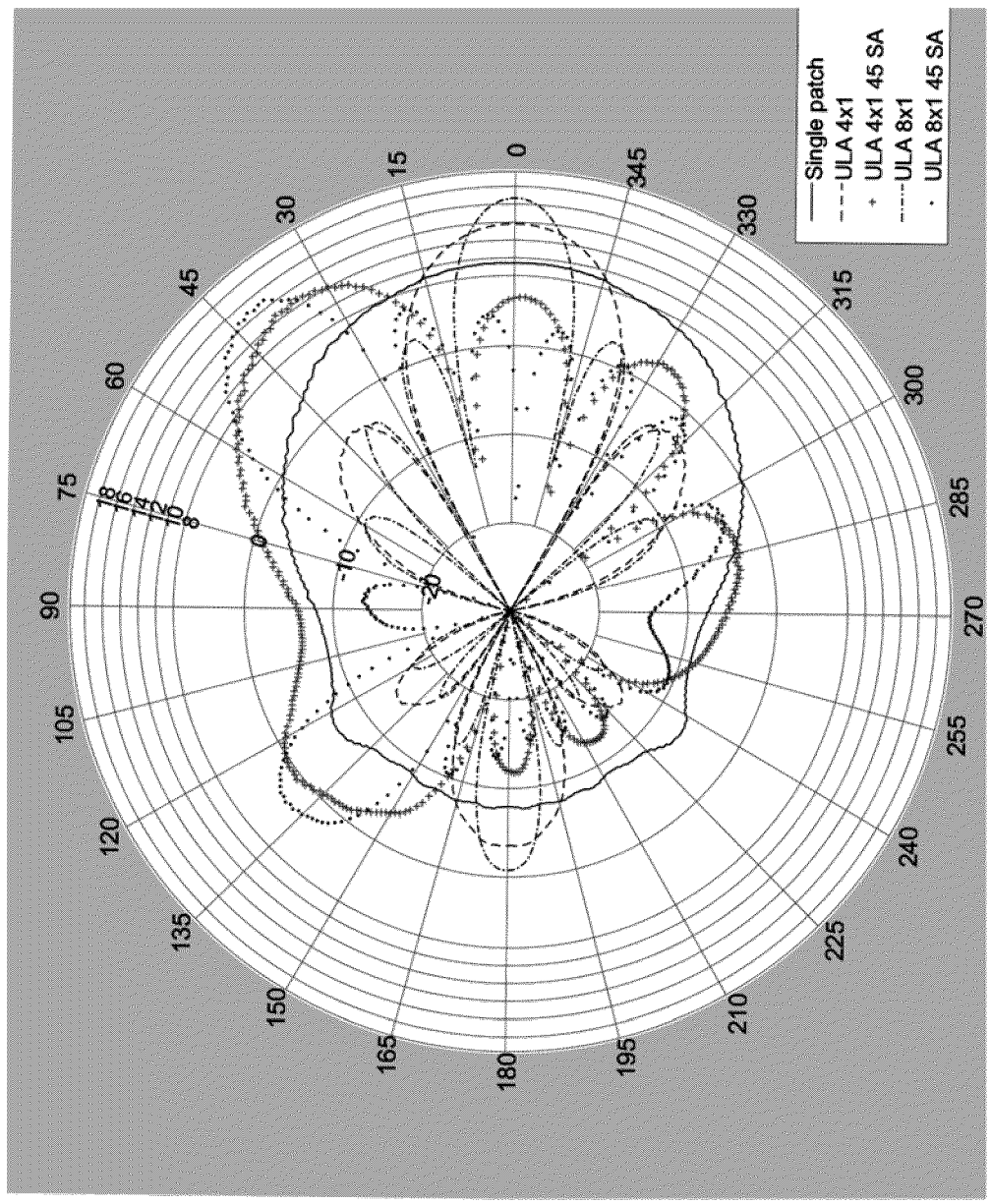
FIG. 4a is a diagram representing directivity patterns of an antenna panel comprising a linear array of patches in different configurations.

FIG. 4a is a diagram of a set of radiation patterns of an eight element linear array (8×1) panel in different configurations:

'Single patch': Only one element of the array is active, which results in the broadest beam pattern and smallest directivity;

'ULA 4×1': 4 elements out of 8 are active, which results in an increased directivity and reduced beamwidth;

'ULA 4×1 45 SA': 4 elements out of 8 are active and the resulting beam is steered at 45 degrees in azimuth;

'ULA 8×1': 8 elements out of 8 are active, which results in maximum directivity and narrowest beamwidth;

'ULA 8×1 45 SA': 8 elements out of 8 are active and the resulting beam is steered at degrees in azimuth.

Figure 4B:
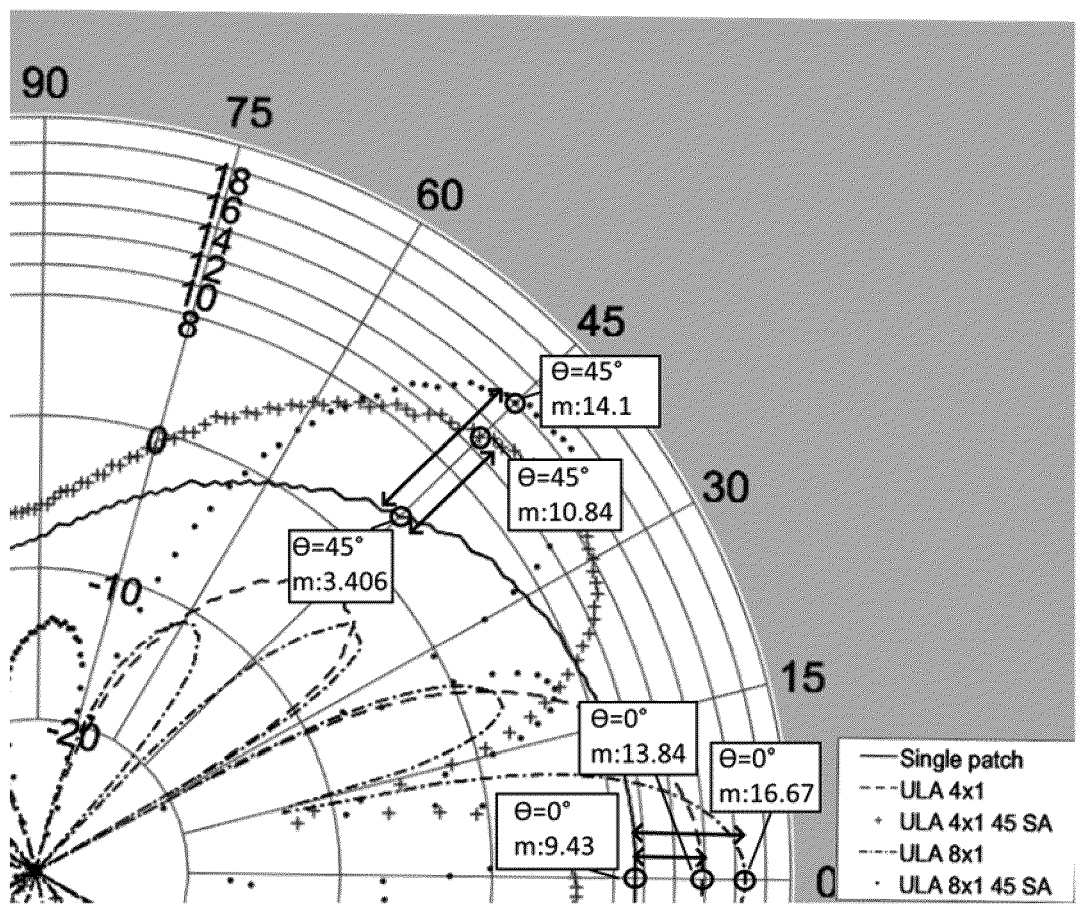

FIG. 4b represents the first quadrant of FIG. 4a. Along the axis at 0° and the axis at 45°, the values for the main lobes of the radiation patterns above are indicated.

As illustrated by FIG. 4a and FIG. 4b, the RSRP levels for a cell/beam measured from different panels may show large differences, due to the lobes' ratio. According to one or more embodiments, this ratio may be calculated and used to estimate the neighbor cell with the serving panel, thus avoiding panel switch and full measurement, thereby saving power. This ratio will not dramatically change across 'X' number of DRX cycles, where 'X' may be UE or base station configured and dependent on the UE's mobility. Hence, the UE can perform complete measurements on the serving cell and each neighbor cell for at least two (or N) measurement occasions and calculate the offset in RSRP level using the same panel as the one used for the serving cell. This offset is expected not to change significantly, unless sudden channel changes occur, which would then trigger a full measurement.

Figure 5:
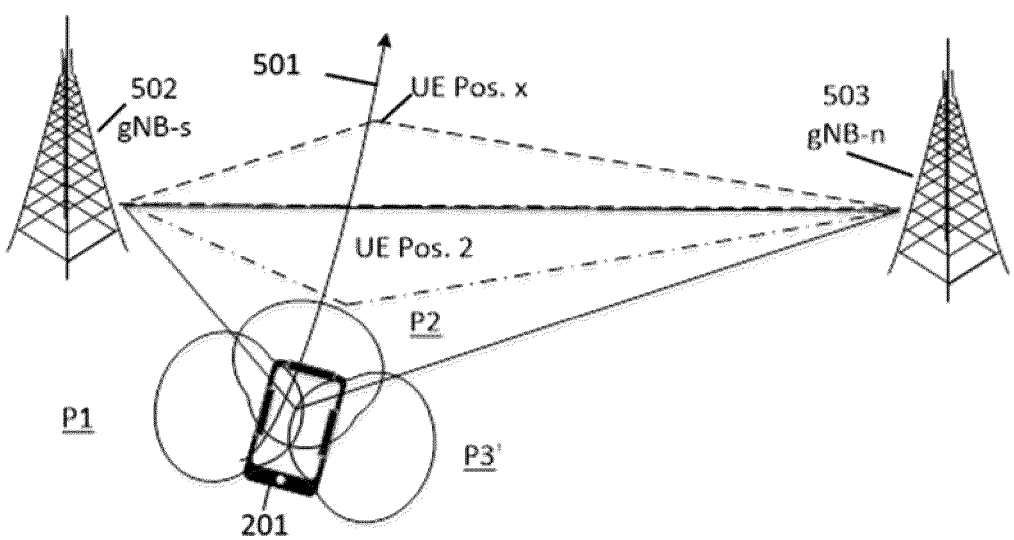
FIG. 5 is a schematic diagram of a multi-panel UE on a trajectory between a serving cell and a neighbor cell.

A numerical example according to one or more exemplary embodiments will now be described with the help of FIG. 5 and Table 2. FIG. 5 is a schematic diagram of UE 201 on a trajectory 501 between a serving cell of a base station 502 and a neighbor cell of a base station 503. For the purpose of the present example, the UE has three antenna panels P1 to P3, already mentioned in relation with FIG. 2. FIG. 5 shows three positions of UE 201 on trajectory 501: position 1, position 2 and position x. Panel P1 is the most appropriate panel for the serving cell 502, and panel P3 is the most appropriate panel for the neighbor cell 503, as determined during the beam alignment process.

Table 2 provides an illustrative example of several RSRP measurements and one RSRP estimate in the context of FIG. 5. P_P1s represents RSRP measurements made of the serving cell with panel P'1, whereas P_P1n, P_P2n and P_P3n represent measurements made with panels P1, P2 and P3 of the neighbor cell.

TABLE 2

| RSRP | P_P1s [dBm] | P_P1n [dBm] | P_P2n [dBm] | P_P3n [dBm] |
| --- | --- | --- | --- | --- |
| UE position 1 | −65 | −95 | −80 | −70 |
| UE position 2 | −64 | −95 | −81 | −69 |
| UE position x | −67 | −94 | | −69 (estimate) |

Default measurements are carried out for UE positions 1 and 2, whereas an estimate is provided for the RSRP measurement of the neighbor cell for UE position x. The offset between the measurement of the neighbor cell using the default measurement process and the measurement of this cell using P1 is −25 dBm (−95+70) when considering position 1. The measurement of the neighbor cell using P1 in position x is −94 dBm. Corrected with the offset, this yields an estimate of 69 dBm. One could also have applied an offset generated using position 2, which would have been of −26 dBm.

According to a variant embodiment, the offset is selected based on the slope of change (linear interpolation) between positions for which default measurements were carried out e.g. an interpolation between positions 1 and 2 in the case of Table 2. According to another variant embodiment, the last value obtained is applied if the last N measured values are within +/−Q dB, where e.g. Q=1. According to a variant embodiment, an average value of offsets calculated in N default measurement cycles is applied.

According to a variant embodiment, if the power level measured for a neighbor cell using the panel selected for the serving cell is below a threshold, then the measurement is deemed not reliable and no estimate is provided for that particular neighbor cell. As an example this threshold may be a reference sensitivity level.

Figure 6:
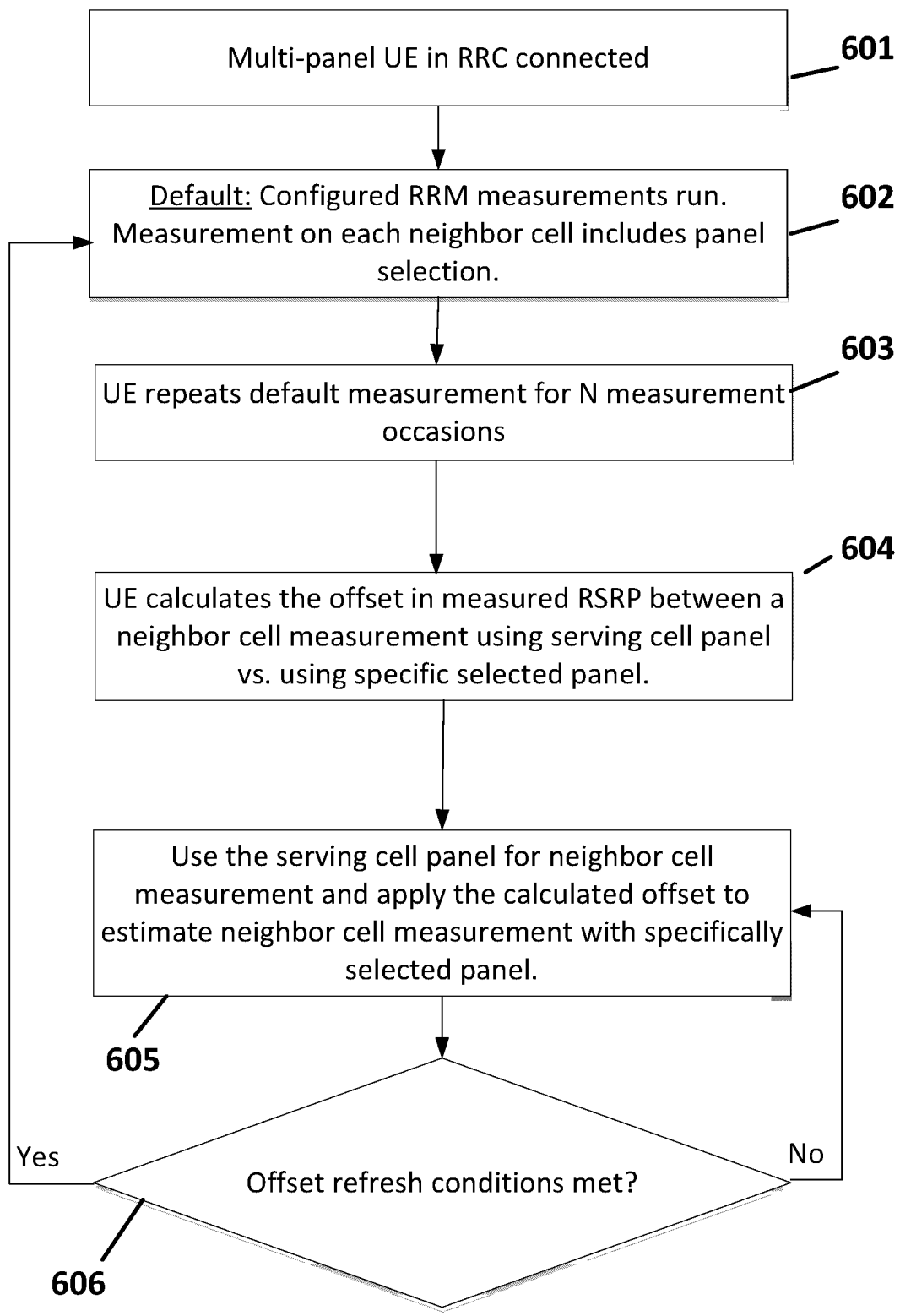
FIG. 6 is a flowchart according to one or more exemplary embodiments.

FIG. 6 is a flowchart illustrating details of one or more exemplary embodiments.

According to a first step 601, the multi panel UE is in RRC connected mode and configured by the network to carry out RRM measurements for the serving cell and a list comprising at least one neighbor cell. In the case of the present embodiment, these measurements comprise RSRP measurements.

According to a step 602, the UE performs the RRM measurements as configured, carrying out the beam management procedure for a given cell as described earlier, before measuring that given cell. This measurement is called 'default measurement' or 'full measurement' herein.

According to a step 603, the UE performs default measurements for N consecutive measurement occasions which, according to the present embodiment, correspond to DRX cycles. N is an integer equal or greater than one, for example N can be selected to be equal to two.

According to a step 604, for each neighbor cell to be measured, the UE records the offset between the RSRP measurement for a given neighbor cell made using the serving cell's best panel and the measurement made with the panel previously determined to be the best panel for the given neighbor cell.

According to a step 605, for the next neighbor cell measurement, the UE measures neighbor cells without switching panels—the measurement is carried out using the serving cell's panel and the UE provides an estimate of a given neighbor cell measurement based on the serving cell panel's measurement to which the offset previously determined for that given neighbor cell is added.

According to a step 606, a check is carried out to determine whether offsets are still considered valid or ought to be refreshed. According to one or more embodiments, the check comprises one or more among:
 a) M consecutive estimate measurement occasions have been performed, where M is an integer greater than one;
 b) the estimated RSRP level of one or more neighbor cells is above a threshold (e.g. a threshold indicative of a need for a handover, such as a threshold configured by the network for measurement report triggering);
 c) the difference between two consecutive RSRP measurements for a given neighbor cell using the serving cell panel is above a threshold (e.g. this possibly being indicative of the blockage of the given neighbor cell);
 d) the UE switches the serving cell to another panel than the one used to calculate the offsets;
 e) a handover to a new serving cell has occurred.

If the check requires refreshing the offsets, the method goes to step 602. Else, it goes to step 604.

According to one or more exemplary embodiments, the check indicates refreshing is necessary when any one of the conditions (a) to (d) is met.

M and N may be determined empirically.

According to one or more exemplary embodiments, N may be function of the mobility of the UE. For example, this mobility may be evaluated based on the variation in the offset between two measurements for a given neighbor cell—if the variation exceeds a threshold, then N may be increased. Other ways of determining mobility of the UE may be used (e.g. based on UE internal sensors).

According to one or more exemplary embodiments, the UE reverts to carrying out full measurements including beam selection (i.e. steps 602 and following) occasionally, for example based on an internal timer and/or based on a number of estimated measurement occasions. The offset for a given neighbor cell is then refreshed. The value of M can be selected accordingly. M may for example be representative of a number of DRX cycles, which themselves are indicative of mobility and channel profile.

According to a variant embodiment, the UE selects a new panel for a serving cell based on a change of orientation e.g. a rotation. This may be independent from the UE moving along a path or being stationary. The change of orientation may be detected using for example sensors internal to the UE. The UE may be able to compensate the change in orientation.

According to a variant embodiment, the UE carries out the default measurement for more than one beam of the neighbor cell during step 603, and derives and stores an offset for each of these beams during step 604. Measurements and estimates are then provided for each beam of a neighbor cell in step 605. For example, estimates may be provided for n beams. As an example, n=4. The retained n beams may be those yielding the highest estimates. The UE may report one or more estimates to the serving cell, as may be useful or required.

According to one or more of the above embodiments, the overall time spent for measurements for panel selection is reduced, because switching between panels is less frequent. As a consequence of the time saving achieved during the measurements, sleep mode can be entered faster and power is saved.

An illustrative numerical example will now be described, based on the following assumptions:
 Let 'X' be the measurement time spent on full RRM measurements with a given DRX cycle over a given period
 Eight RRM measurements are performed per DRX cycle
 The eight measurements comprise three full measurements followed by five measurements with estimate measurements being calculated for neighbor cells as described
 An MPUE with three panels is used, hence relative measurement time for measurements with estimates compared to full measurements is 33% (⅓)

The time saved based on the assumptions made may be calculated as follows:
 Estimated measurement time: Y=⅜*X+⅝*X*0.33
 Estimated time saving: (X−Y)/X%=(X−(⅜*X+⅝*X*0.33))/X %=41.67%

Actual savings may dependent among other factors on how many measurements can be performed using the panel selected for the serving cell also for neighbor cells before a full measurement becomes necessary to refresh the offset. Furthermore, the reduction on measurement time by eliminating panel selection is dependent on the number of panels. This example assumes a UE with three panels. Considering a two-panel UE the time saving would be around 31% while for a four-panel UE, the relative saving would be around 47%.

According to a variant exemplary embodiment, the process of measuring power of a cell on one panel and using the result to estimate the power of a cell as measured from another panel is a feature that may be switched off. According to another variant embodiment, the switching on or off of this feature may be UE controlled and/or network controlled.

According to a variant embodiment, the feature may be used in case of high mobility, in case of low mobility, or in both cases.

Figure 7:
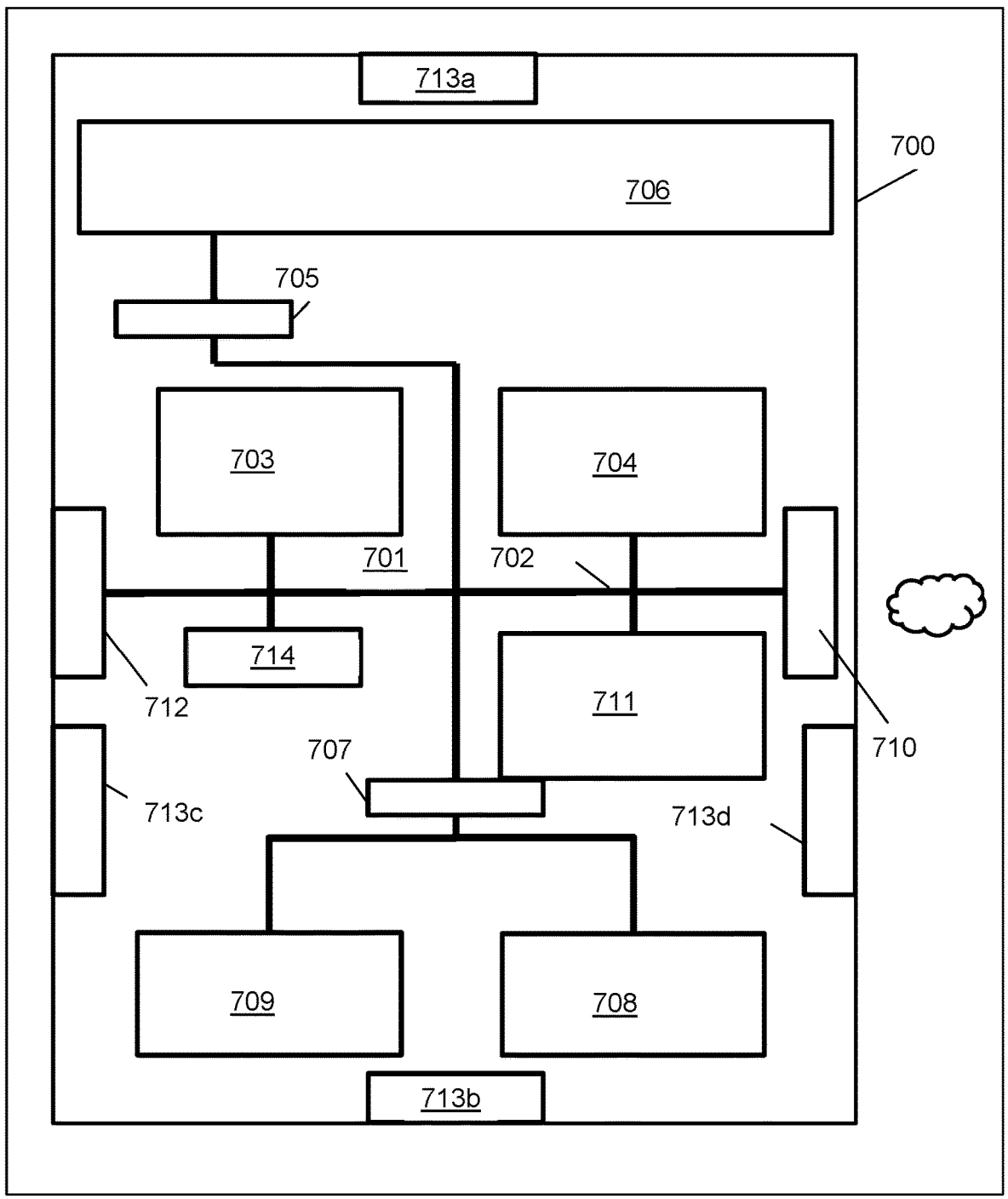
FIG. 7 is a schematic block diagram of a user equipment UE according to one or more exemplary embodiments.

FIG. 7 is a block diagram of a device 700 that, according to an exemplary embodiment, can be used to implement a user equipment or UE. The device 700 comprises a printed circuit board 701 on which a communication bus 702 connects a processor 703, a random access memory 704, a storage medium 711, an interface 705 for connecting a display 706, a series of connectors 707 for connecting user interface devices or modules such as a mouse or trackpad 708 and a keyboard 709, a wireless network module 710 connected to antenna panels 713*a*, 713*b*, 713*c* and 713*d* (connections not shown), and a wired network interface 712. The UE moreover comprises at least one sensor 714, which may comprise one or more among an accelerometer, gyroscope, compass and/or other sensors or modules for determining velocity, acceleration, orientation/rotation and/or geographical positioning. Depending on the functionality required, the UE may implement only part of the above. Certain modules of FIG. 7 may be internal or connected externally, in which case they do not necessarily form integral part of the device itself. E.g. display 706 may be a display that is connected to a device only under specific circumstances, or the device may be controlled through another device with a display, i.e. no specific display 706 and interface 705 are required for such a device. The storage medium 711 may be a ROM and contains code that, when executed by said processor 704, causes the apparatus and its components to carry out the methods described in the present description.

Antenna panels are placed on left, right, upper and lower internal sides of the UE. Obviously, there may be more or less panels and they may be placed differently, e.g. to take into account the specifics of the UE, such as the bulk of other components, or the impact of these components on reception and emission quality.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

EXAMPLES

Example EA 1—A communication device (102, 201, 700) comprising:
   a plurality of antenna panels (713*a-d*) for communication with cells in a cellular network,
   means for carrying out a panel selection process based on received power level for selecting a respective antenna panel among said plurality of antenna panels for each of a serving cell (502) and a neighbor cell (503);
   means for performing measurement cycles (602, 603) requiring determination of respective power levels received from said serving cell (502) and said neighbor cell (503);
   said means for performing measurement cycles being configured to, during a first type measurement cycle (604), measuring a first received power level from said neighbor cell (503) with the antenna panel (P3) selected for said neighbor cell (503) and measuring a second received power level from said neighbor cell (503) with the antenna panel (P1) selected for said serving cell (502);
   said means for performing measurement cycles being further configured to, during a second type measurement cycle (605), measuring a third power level received for said neighbor cell (503) with the antenna panel (P1) selected for said serving cell (502) and adjusting said third power level with an offset function of the difference between the first and second power levels, said adjusted third power level being used as the respective power level for said neighbor cell (503).

Example EA 2 Communication device according to Example EA 1, wherein said means for performing said measurement cycles are further configured to measure first, second and third power levels for a plurality of beams of said neighbor, and to carry out adjustment of said third power level of each beam of said plurality of beams.

Example EA 3. Communication device according to Example EA 1 or EA 2, wherein the panel selection process and the measurement cycles are carried out for a plurality of neighbor cells.

Example EA 4. Communication device according to one of the Examples EA 1 to EA 3, wherein the received power level is a Reference Signal Received Power level.

Example EA 5. Communication device according to one of the Examples EA 1 to EA 4, further comprising means for performing an offset confidence check wherein if said check fails, said first and second power levels are refreshed by performing at least one first type measurement cycle.

Example EA 6. Communication device according to Example EA 5, wherein said offset confidence comprises checking one or more of the following conditions and that the check fails if at least one among the checked conditions is met:
   M consecutive second type measurement cycles have been performed, where M is an integer equal to or greater than one;
   the respective power level for at least one neighbor cell resulting from the adjustment of the third power level is above a first threshold;
   the difference between two consecutive measurements of said second power level is above a second threshold;
   the communication device selects a different antenna panel for the serving cell;
   a handover to a new serving cell has occurred.

Example EA 7. Communication device according to Example EA 6, wherein M decreases with increasing mobility of said communication device.

Example EA 8. Communication device according to one of the Examples EA 1 to EA 7, wherein said means for performing the measurement cycles are configured to perform the first type measurement cycle N consecutive times, with N being an integer increasing with the mobility of said communication device.

Example P 1 A method at a communication device (201, 700) comprising a plurality of antenna panels (713*a-d*) for communication with cells in a cellular network, said method comprising:
   carrying out a panel selection process based on received power level for selecting a respective antenna panel among said plurality of antenna panels for each of a serving cell (502) and a neighbor cell (503);
   performing measurement cycles (602, 603) requiring determination of respective power levels received from said serving cell (502) and said neighbor cell (503);
   during a first type measurement cycle (604), measuring a first received power level from said neighbor cell (503) with the antenna panel (P3) selected for said neighbor cell (503) and measuring a second received power level from said neighbor cell (503) with the antenna panel (P1) selected for said serving cell (502);
   during a second type measurement cycle (605), measuring a third power level received from said neighbor cell (503) with the antenna panel (P1) selected for said serving cell (502) and adjusting said third power level with an offset function of the difference between the first and second power levels, said adjusted third power level being used as the respective power level for said neighbor cell (503).

Example P 2. Method according to Example P 1, further comprising performing said measurement cycles to measure first, second and third power levels for a plurality of beams of said neighbor cell, and to carry out adjustment of said third power level of each beam of said plurality of beams.

Example P 3. Method according to Example P 1 or P 2, wherein the panel selection process and the measurement cycles are carried out for a plurality of neighbor cells.

Example P 4. Method according to one of the Examples P 1 to P 3, wherein the received power level is a Reference Signal Received Power level.

Example P 5. Method according to one of the Examples P 1 to P 4, further comprising an offset confidence check wherein if said check fails, said offset is refreshed by performing at least one first type measurement cycle.

Example P 6. Method according to Example P 5, wherein said offset confidence check comprises checking one or more of the following conditions and that the check fails if at least one among the checked conditions is met:
  M consecutive second type measurement cycles have been performed, where M is an integer equal to or greater than one;
  the respective power level for at least one neighbor cell resulting from the adjustment of the third power level is above a first threshold;
  the difference between two consecutive measurements of said second power level is above a second threshold;
  the communication device selects a different antenna panel for the serving cell;
  a handover to a new serving cell has occurred.

Example P 7. Method according to Example P 6, wherein M decreases with increasing mobility of said communication device.

Example P 8. Method according to one of the Examples P 1 to P 7, wherein the first type measurement cycle is performed N consecutive times, with N being an integer increasing with the mobility of said communication device.

Example CRM 1. A non-transitory computer-readable medium (711) storing computer-executable code that, when executed by at least one processor (703) at a communication device (201, 700), causes the communication device to perform the steps of the method according to one of the Examples P 1 to P 7.

Example UA 1. A communication device (201, 700) comprising a plurality of antenna panels (713*a-d*) for communication with cells in a cellular network, at least one processor and at least one memory comprising computer program code, the at least one memory and the computer program code being configured, with the at least one processor, to cause the communication device to at least perform:
  carrying out a panel selection process based on received power level for selecting a respective antenna panel among said plurality of antenna panels for each of a serving cell (502) and a neighbor cell (503);
  performing measurement cycles (602, 603) requiring determination of respective power levels received from said serving cell (502) and said neighbor cell (503);
  during a first type measurement cycle (604), measuring a first received power level from said neighbor cell (503) with the antenna panel (P3) selected for said neighbor cell (503) and measuring a second received power level from said neighbor cell (503) with the antenna panel (P1) selected for said serving cell (502);
  during a second type measurement cycle (605), measuring a third power level received from said neighbor cell (503) with the antenna panel (P1) selected for said serving cell (502) and adjusting said third power level with an offset function of the difference between the first and second power levels, said adjusted third power level being used as the respective power level for said neighbor cell (503).

Example UA 2. Communication device according to Example UA 1, wherein said means for performing said measurement cycles are further configured to measure first, second and third power levels for a plurality of beams of said neighbor cell, and to carry out adjustment of said third power level of each beam of said plurality of beams.

Example UA 3. Communication device according to one of the Examples UA 1 or UA 2, wherein the panel selection process and the measurement cycles are carried out for a plurality of neighbor cells.

Example UA 4. Communication device according to one of the Examples UA 1 to UA 3, wherein the received power level is a Reference Signal Received Power level.

Example UA 5. Communication device according to one of the Examples UA 1 to UA 4, wherein the at least one memory and the computer program code are further configured, with the at least one processor, to cause the communication device to perform an offset confidence check wherein if said check fails, said offset is refreshed by performing at least one first type measurement cycle.

Example UA 6. Communication device according to Example UA 5, wherein said offset confidence check comprises checking one or more of the following conditions and that the check fails if at least one among the checked conditions is met:
  M consecutive second type measurement cycles have been performed, where M is an integer equal to or greater than one;
  the respective power level for at least one neighbor cell resulting from the adjustment of the third power level is above a first threshold;
  the difference between two consecutive measurements of said second power level is above a second threshold;
  the communication device selects a different antenna panel for the serving cell;
  a handover to a new serving cell has occurred.

Example UA 7. Communication device according to Example UA 6, wherein the at least one memory and the computer program code are further configured, with the at least one processor, to cause the communication device to decrease M with increasing mobility of said communication device.

Example UA 8. Communication device according to one of the Examples UA 1 to UA 7, wherein the at least one memory and the computer program code are further configured, with the at least one processor, to cause the communication device to perform the first type measurement cycle N consecutive times, with N being an integer increasing with the mobility of said communication device.

The invention claimed is:
1. A communication device, comprising:
  a plurality of antenna panels for communication with cells in a cellular network;
  at least one processor; and
  at least one memory storing instructions that, when executed with the at least one processor, cause the communication device to:

carry out a panel selection process based on received power level for selecting a respective antenna panel among said plurality of antenna panels for a serving cell and a neighbor cell;

perform measurement cycles requiring determination of respective power levels received from said serving cell and said neighbor cell;

measure a first received power level from said neighbor cell with the antenna panel selected for said neighbor cell and measure a second received power level from said neighbor cell with the antenna panel selected for said serving cell; and measure a third power level received for said neighbor cell with the antenna panel selected for said serving cell and adjust said third power level with an offset function of the difference between the first and second power levels, said adjusted third power level being used as the respective power level for said neighbor cell.

2. Communication device according to claim 1, wherein the instructions, when executed with the at least one processor, cause the communication device to measure first, second, and third power levels for a plurality of beams of said neighbor cell, and to carry out adjustment of said third power level of the beams.

3. Communication device according to claim 1, wherein the instructions, when executed with the at least one processor, cause the communication device to carry out the measurement cycles for a plurality of neighbor cells.

4. Communication device according to claim 1, wherein the received power level is a reference signal received power level.

5. Communication device according to claim 1, wherein the instructions, when executed with the at least one processor, cause the communication device to perform an offset confidence check wherein if said check fails, said first and second power levels are refreshed with performing at least one first type measurement cycle.

6. Communication device according to claim 5, wherein said offset confidence check comprises checking one or more of the following conditions and that the check fails if at least one among the checked conditions is met:

M consecutive second type measurement cycles have been performed, where M is an integer equal to or greater than one;

the respective power level for at least one neighbor cell resulting from the adjustment of the third power level is above a first threshold;

the difference between two consecutive measurements of said second power level is above a second threshold;

the communication device selects a different antenna panel for the serving cell; or a handover to a new serving cell has occurred.

7. Communication device according to claim 6, wherein M decreases with increasing mobility of said communication device.

8. Communication device according to claim 1, wherein said instructions, when executed with the at least one processor, cause the communication device to perform the first type measurement cycle N consecutive times, with N being an integer increasing with the mobility of said communication device.

9. A method at a communication device comprising a plurality of antenna panels for communication with cells in a cellular network, said method comprising:

carrying out a panel selection process based on received power level for selecting a respective antenna panel among said plurality of antenna panels for a serving cell and a neighbor cell;

performing measurement cycles requiring determination of respective power levels received from said serving cell and said neighbor cell;

during a first type measurement cycle, measuring a first received power level from said neighbor cell with the antenna panel selected for said neighbor cell and measuring a second received power level from said neighbor cell with the antenna panel selected for said serving cell; and during a second type measurement cycle, measuring a third power level received from said neighbor cell with the antenna panel selected for said serving cell and adjusting said third power level with an offset function of the difference between the first and second power levels, said adjusted third power level being used as the respective power level for said neighbor cell.

10. Method according to claim 9, wherein the panel selection process and the measurement cycles are carried out for a plurality of neighbor cells.

11. Method according to claim 9, wherein the received power level is a reference signal received power level.

12. Method according to claim 9, further comprising an offset confidence check wherein if said check fails, said offset is refreshed with performing at least one first type measurement cycle.

13. Method according to claim 12, wherein said offset confidence check comprises checking one or more of the following conditions and that the check fails if at least one among the checked conditions is met:

M consecutive second type measurement cycles have been performed, where M is an integer equal to or greater than one;

the respective power level for at least one neighbor cell resulting from the adjustment of the third power level is above a first threshold;

the difference between two consecutive measurements of said second power level is above a second threshold;

the communication device selects a different antenna panel for the serving cell; or a handover to a new serving cell has occurred.

14. Method according to claim 13, wherein M decreases with increasing mobility of said communication device.

15. Method according to claim 9, wherein the first type measurement cycle is performed N consecutive times, with N being an integer increasing with the mobility of said communication device.

16. A non-transitory program storage device readable with an apparatus, tangibly embodying a program of instructions executable with the apparatus for performing the method of claim 9.

* * * * *